March 18, 1969  D. CREE ET AL  3,434,064
AMPLIFIER DRIFT TESTER
Filed Feb. 17, 1966

INVENTORS
DAVID CREE
GUSS E. WENZEL
BY
ATTORNEYS

INVENTORS
DAVID CREE
GUSS E. WENZEL

United States Patent Office 3,434,064
Patented Mar. 18, 1969

3,434,064
AMPLIFIER DRIFT TESTER
David Cree, Houston, and Guss E. Wenzel, Friendswood, Tex., assignors to the United States of America as represented by the Administrator of the National Aeronautics and Space Administration
Filed Feb. 17, 1966, Ser. No. 529,609
U.S. Cl. 330—2
Int. Cl. G01r 23/02
2 Claims

ABSTRACT OF THE DISCLOSURE

A device for automatically measuring and recording the gain and zero drift characteristics of an electronic amplifier during long-term dynamic environmental conditions. The apparatus comprises a stable voltage source and voltage dividing means for reducing the source voltage by a factor equal to the reciprocal of the rated amplifier gain. An automatic switching means, periodically connects the voltage source across the voltage dividing means and alternately shorts across the voltage dividing means to thereby sequentially and repeatedly apply the reduced voltage and a zero voltage to the amplifier input. Zero drift, as represented by an amplifier output voltage during application of the zero input voltage, and the combined effects of zero drift and gain drift, as represented by the difference between amplifier output voltage and the source voltage during application of the reduced voltage, are recorded continuously by a differential voltage recording means. For amplifier systems having an associated transducer power supply, the automatic switching means and a second switching means act in synchronism to also periodically couple the source voltage and a fraction of the rated power supply voltage to the differential voltage recording means to obtain an indication of power supply drift.

---

The invention described herein was made by employees of the United States Government and may be manufactured and used by or for the Government for governmental purposes without the payment of any royalties thereon or therefor.

This invention relates to an apparatus for testing D.C. amplifiers, and more particularly to an apparatus for measuring zero drift, gain stability, and power supply stability in D.C. amplifiers over an extended period of time.

The most serious problems in the design and use of D.C. amplifiers involve drift in the amplifier output signal. Fluctuations in supply and bias voltages, changes in bias currents and circuit components, variations in ambient temperature, and the like, are among the many contributory factors to the problem of drift. Since D.C. amplifiers used in aerospace instrumentation systems are subjected to constantly changing environmental conditions and frequently radical changes, the problem of amplifier drift is of particular concern in such applications.

By the method heretofore generally accepted for determining drift of D.C. amplifiers, the amplifier is allowed to warm up to the ambient temperature and a stable input signal is applied. A measurement of output voltage is then made and after a specified period of time during which the unit may be subjected to different environmental conditions, a second measurement of output is made. Any difference between the two measurements is considered to constitute the total drift of the amplifier. This method, however, overlooks the fact that an amplifier is virtually never operated under ideal conditions wherein it is allowed a long period of stabilization within a constant environment, and, most significantly, provides no information as to how the amplifier operates during the changing phases of environmental conditions. In aerospace instrumentation systems and other systems exposed to dynamic environments, it is necessary to know how equipment performs under changing conditions, as well as under long-term constant conditions. Consequently, the generally accepted method for testing amplifier drift does not provide adequate information for determining amplifier performance under actual flight conditions. It also requires the presence of an operator to perform the testing and ignores the possibility of instability in the associated transducer power supply.

By this invention which has been devised to overcome the disadvantages attendant to the prior art methods and apparatuses, the gain and zero drift characteristics of an electronic amplifier can be measured automatically during long-term dynamic environmental conditions. It additionally provides information as to the output stability of the transducer power supply. The apparatus of the invention comprises a stable voltage source and means for attenuating the source voltage by a factor equal to the reciprocal of the rated amplifier gain. The reduced attenuated voltage is supplied as the signal input to the amplifier. By maintaining a constant attenuation, any difference between amplifier output voltage and the signal source voltage constitutes an error voltage representative of the combined effects of zero drift and gain drift in the amplifier. For recording and displaying the error voltage, a null meter or other suitable recording means is appropriately connected in the circuit. Measurement of drift is accomplished by provision of a switching means which applies an input voltage to the amplifier during regular periodic intervals between which there is zero input to the amplifier. Consequently, as the stable voltage source is switched between zero voltage and a finite value, the null meter indicates zero drift when there is zero input and indicates total drift when a finite input signal is applied.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 1:
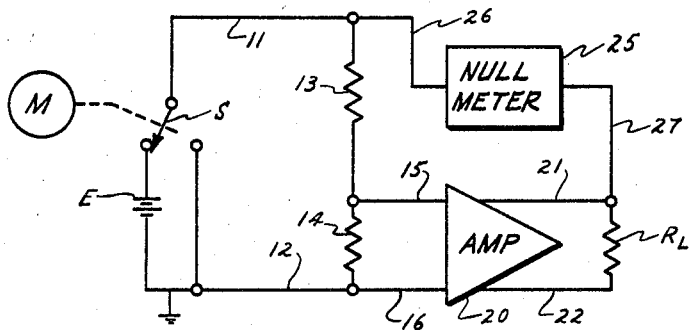
FIG. 1 is a schematic-block diagram of an embodiment of the invention for measuring amplifier drift.

Referring more particularly to the drawings, there is shown in FIG. 1 a basic embodiment of the invention for measuring amplifier drift. A voltage source E provides a very stable reference voltage which is applied by means of conductors 11 and 12 across a voltage-dividing network comprised of the resistors 13 and 14. The voltage developed across the resistor 14 is supplied by the conductors 15 and 16 as the input to the D.C. amplifier 20 which normally produces a zero output for zero input. The output of the amplifier is delivered by the conductors 21 and 22 across the load resistance $R_L$.

For operational testing of the amplifier 20, the variable resistor 13 is adjusted such that the ratio of the sum of the resistances 13 and 14 to the resistance 14 equals the rated amplifier gain. In this manner the signal source voltage is reduced by a factor which is the reciprocal of the rated amplifier gain so that in the absence of amplifier drift the amplifier output voltage equals the source voltage. If there is amplifier drift, however, the output voltage will differ from the signal source voltage, and for detecting drift a null meter 25 is connected in circuit by the conductor 26 to one terminal of the resistor 13 and a conductor 27 to one terminal of the resistor $R_L$. The null meter, therefore, provides an indication of any difference between the amplifier output voltage and the signal source voltage. An indicated differential voltage constitutes an error voltage representative of the combined effects of zero drift and gain drift in the amplifier.

To facilitate the separate determination of zero drift, a switching means S is provided which operates periodically to move the switch from its first position in which the voltage E is connected in the circuit to a second position in which the voltage E is disconnected from the circuit and conductor 11 is connected to conductor 12 to provide a short across the resistors 13 and 14. Consequently, as the input is switched between zero voltage and finite voltage value, the null meter records a differential voltage V which corresponds to zero drift during the periods when there is zero input to the amplifier, and which provides an indication of total amplifier drift when a finite input signal is applied. The switching means S is cam-driven by a suitable motor such as will rotate the cam by one r.p.m., for example. By appropriate design the switch may be closed for approximately two-thirds of a revolution, during which time a finite input signal is applied to the amplifier. In this manner, the recording may be coded for separating total drift from zero drift.

Figure 2:
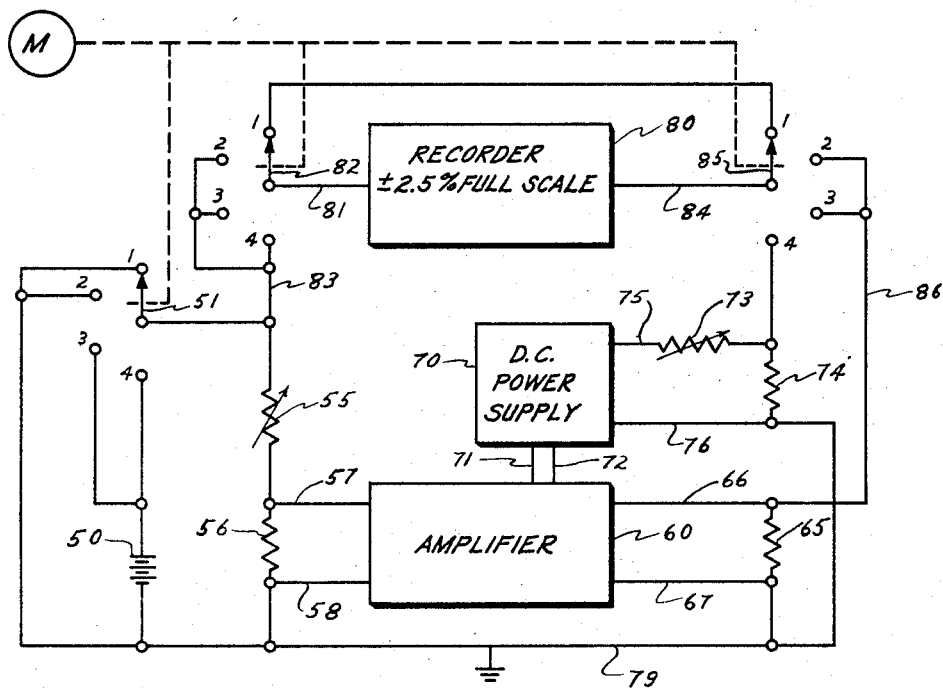
FIG. 2 is a schematic-block diagram of an embodiment of the invention which is also adapted to measure the stability of an associated transducer power supply.

A more practical embodiment of the invention, shown in FIG. 2, provides a circuit which is adaptable for testing a D.C. amplifier and its transducer power supply. For purposes of illustration, a voltage source 50 is used which provides a very stable reference source voltage such as 5 volts. The source voltage is connectable by means of a motor-driven switching means 51 across a voltage dividing network which comprising the resistors 55 and 56. The voltage across the resistor 56 is supplied by conductors 57 and 58 as the input signal to the amplifier 60 which is designed to provide zero output for zero input. The amplifier output is delivered to a load resistance 65 by means of conductors 66 and 67. The D.C. power supply 70 receives its power from the same power source as the amplifier 60 by means of conductors 71 and 72. The power supply output voltage, intended to power an external transducer, is delivered across a pair of series-connected voltage dividing resistors 73 and 74 by means of conductors 75 and 76 for test purposes. One side of the voltage source 50 and one terminal of each of the resistors 56, 65, and 74 are connected to a common ground conductor 79.

It will therefore be noted that when the switching means 51 is in the position 4, the source voltage is applied across the voltage dividing the network and the voltage across the resistor 56 is applied as the input signal to the amplifier. For operational testing of the amplifier the resistor 55 is adjusted such that the ratio of its resistance plus the resistance of resistor 56 to that of the resistor 56 is equal to the rated amplifier gain. Consequently, in the absence of amplifier drift the output voltage of the amplifier should equal the value of the source voltage 50. Any difference in amplifier output voltage and the source voltage is produced by the combined effects of zero drift and gain drift in the amplifier 60. This differential voltage is measured by means of a null meter recorder 80 which is connectable by a conductor 81 and by a switching means 82 and conductor 83 to one terminal of the resistor 55, and by a conductor 84, switching means 85, and conductor 86 to the underground terminal of the load resistance 65. The meter 80 measures the differential voltage and records it, preferably on a strip chart, as it varies with time. In the embodiment of the invention illustrated in FIG. 2, a pen recorder, Mark 200, manufactured by Brush Instruments Co., was satisfactorily employed.

As shown in FIG. 2, the three switches 51, 82, and 85 each include a rotatable contact element which is driven by the motor M at a desirable rate, for example, one r.p.m. The switches are driven simultaneously and in synchronism to successively engage the contacts 1 through 4. When the switching elements engage contact 1, the recorder input terminals are shorted, which condition will normally verify that the recorder zero has not changed, but will also indicate if recorder adjustment is necessary. With the switches in position 2, there is zero input voltage to the amplifier, and the null meter measures and records the zero drift of the amplifier. In contact position 3, the switch 51 connects the voltage source 50 across the voltage-dividing resistors 55 and 56, and an input signal is applied to the amplifier. In this position of the switches the null meter measures and records a differential voltage which is equal to zero drift plus gain drift.

With the switches in the contact 4 position, the voltage from the voltage source 50 is applied to one input terminal of the meter recorder 80. The other input terminal of the recorder 80 is connected to the junction of the voltage dividing resistors 73 and 74. Since a 10-volt power supply is used in the apparatus of FIG. 2, the resistances 73 and 74 are selected of equal value, whereby one-half of the power supply output is compared with the 5 volt source voltage. In the absence of power supply drift, one-half of the power supply output voltage equals the source voltage and a zero differential voltage is indicated by the recorder. An indication of a differential voltage, however, is representative of one-half of the total power supply drift.

It will therefore be noted that this invention makes possible the continual monitoring and testing of D.C. amplifiers over extended test periods during which they may be subjected to changing environmental conditions. Measurements of zero drift, amplifier drift, and transducer power supply, if applicable, are continuously made and their validity indicated by monitoring of the null meter stability. Preferably, these three parameters are recorded each minute in accordance with the rate at which the switches are rotated. Amplifier performance under dynamic environmental conditions can therefore be readily and accurately determined.

For effective amplifier testing, of course, it is necessary that the voltage source selected be extremely stable and preferably have a stability within .01% of rated value over a wide range of ambient temperatures. The switching means might also comprise means other than motor driven switches, such as for example, electronic timing devices and relay switching. In the embodiment of the invention illustrated in FIG. 2, the voltage dividing resistors 73 and 74 should be selected so that the voltage developed across the resistor 74 is that fractional part of the rated power supply which equals the particular source voltage used. The measurement of power supply drift therefore represents the same fraction of the total power supply drift.

Figure 3:
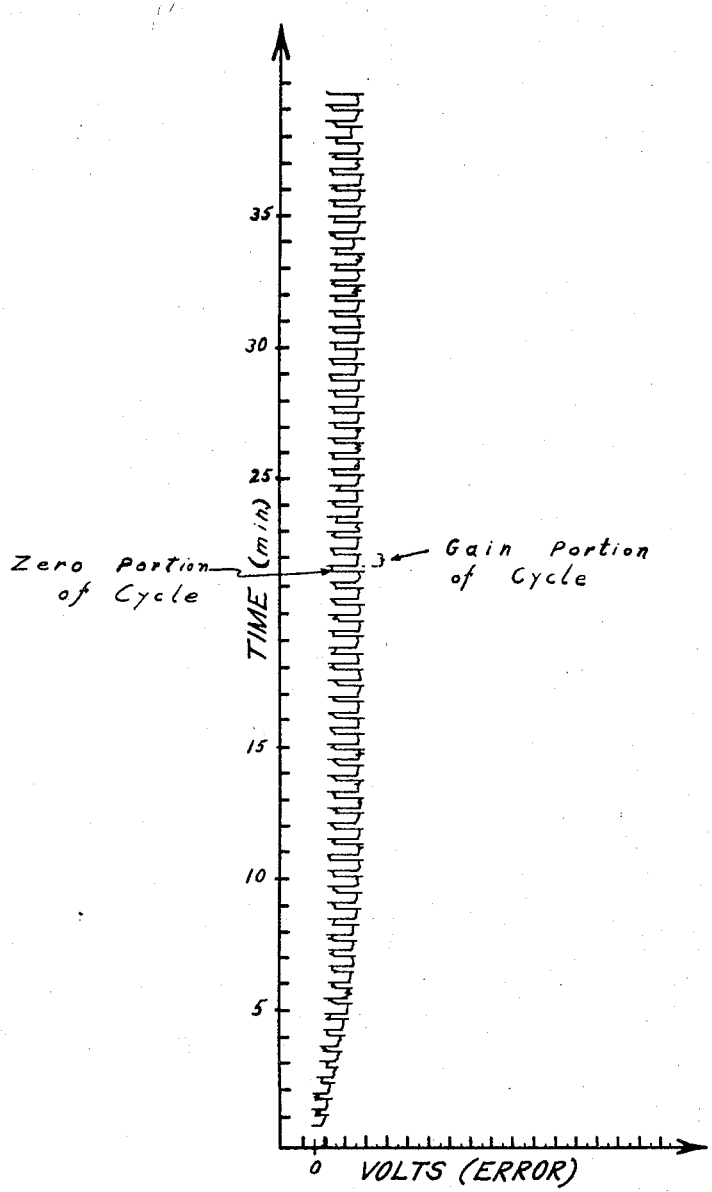
FIG. 3 is a typical recording of the differential voltage between amplifier output and the signal source voltage.

In FIG. 3 there is shown a typical recording made during a test in which a test amplifier was subjected to a wide range of temperatures. Initially, at room temperature no drift was indicated. During the period from $t=0$ min. to $t=35$ min., the amplifier was exposed to a temperature of $-20°$ C. At 25 min. the amplifier showed a zero drift of $+.035\%$ and a gain shift of $+0.55\%$. Similar tests while in a heated environment showed a gain shift in the negative direction.

The embodiment of the invention shown in FIG. 2 is particularly suited for a flight instrumentation amplifier which is operatively associated with a transducer having its own power supply. Since the apparatus of FIG. 2 records three measurements which are time shared on a single recorder trace, a time coding method should be established. One method would be to allot a different proportion of recording time for one or more of the measurements, although other coding methods could satisfactorily be employed.

It is also to be understood that while the amplifiers are described herein as normally producing a zero output for zero input, the apparatus might also be used for testing amplifiers which produce an output voltage when a zero input is applied. In this event the differential voltage indicated by the null meter must be corrected to determine the drift.

What is claimed and desired to be secured by Letters Patent is:

1. An apparatus for measuring and recording the gain stability and zero drift characteristics of an electronic amplifier, said apparatus comprising:

a source of electrical energy providing a stable voltage;

voltage dividing means for reducing the stable voltage from said source by a factor equal to the reciprocal of the rated amplifier gain, said voltage dividing means having a pair of input terminals for receiving a voltage to be reduced and also having a pair of output terminals;

conductor means coupling said output terminals and said reduced voltage to the input of the amplifier;

automatic means operatively associated with said source of electrical energy and said voltage dividing means for alternately shorting across said input terminals of said voltage dividing means and then applying said source voltage across the input terminals of said voltage dividing means to thereby sequentially and repeatedly apply a zero voltage signal and said reduced voltage to the input of the amplifier; and measuring and recording means for continuously measuring and recording the respective differential voltage existing between the output voltage of the amplifier and said zero input voltage during the application of said zero input voltage and between the output voltage of the amplifier and said stable source voltage during the application of said reduced voltage to the amplifier, said measuring and recording means having first and second input terminals; means coupling the output of the electronic amplifier to said first input terminal of said recording means during the applications of said zero voltage signal and said reduced voltage to the amplifier input; and means coupling said second input terminal of said recording means to the terminal of said voltage dividing means which periodically receives said source voltage to thereby provide an indication of zero drift of the amplifier during the applications of zero voltage input signal to the amplifier and said recording means and an indication of total amplifier drift during the applications of said reduced voltage to the amplifier.

2. An apparatus for measuring the operating characteristics of an electronic instrumentation system including an electronic amplifier and an associated transducer power supply, said apparatus comprising:

a source of electrical energy providing a stable voltage;

voltage dividing means for reducing the stable voltage from said source by a factor equal to the reciprocal of the rated amplifier gain, said voltage dividing means having a pair of input terminals for receiving the voltage to be reduced and also having a pair of output terminals;

conductor means coupling said output terminals and said reducing voltage to the input of the amplifier;

first automatic switching means operatively associated with said source of electrical energy and said voltage dividing means for sequentially shorting across said input terminals of said voltage dividing means and then coupling said source voltage across the input terminals of said voltage dividing means to thereby sequentially and repeatedly apply a zero voltage signal and said reduced voltage to the input of the amplifier;

a differential voltage recording means having first and second input terminals and adapted to measure and record the differential voltage representing the difference in voltage levels applied to said first and second input terminals;

a second automatic switching means operatively associated with said first automatic switching means for sequentially and repeatedly applying said zero voltage signal and said source voltage to said first input terminal of the differential voltage recording means in synchronism with the application of said zero voltage and said reduced voltage to the amplifier input; and third automatic switching means operatively associated with said first and second automatic switching means and operating in synchronism with said first and second switching means for coupling said second input terminal of the differential voltage recording means to the amplifier output during the sequential applications of said zero voltage signal and said source voltage to said first input terminal of said recording means to thereby obtain indications of zero drift and total amplifier drift and then coupling said second input terminal to the power supply output during the application of the source voltage to said differential voltage recording means to thereby obtain an indication of power supply stability.

References Cited

UNITED STATES PATENTS

| | | | |
|---|---|---|---|
| 2,676,300 | 4/1954 | Hirsch et al. | 324—98 |
| 3,012,197 | 12/1961 | Peterson et al. | 330—2 X |
| 3,204,179 | 8/1965 | Fuller | 330—2 X |

NATHAN KAUFMAN, *Primary Examiner.*

U.S. Cl. X.R.

324—123; 330—51